US012257693B2

(12) United States Patent
Heath et al.

(10) Patent No.: US 12,257,693 B2
(45) Date of Patent: Mar. 25, 2025

(54) MODULAR TOOL CONTAINER

(71) Applicant: MILWAUKEE ELECTRIC TOOL CORPORATION, Brookfield, WI (US)

(72) Inventors: Peter R. Heath, Wauwatosa, WI (US); Steven W. Hyma, Milwaukee, WI (US); Benjamin T. Jones, St. Francis, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/721,521

(22) Filed: Apr. 15, 2022

(65) Prior Publication Data

US 2022/0234190 A1 Jul. 28, 2022

Related U.S. Application Data

(63) Continuation of application No. 17/269,286, filed as application No. PCT/US2019/050168 on Sep. 9, 2019, now Pat. No. 11,717,954.

(Continued)

(51) Int. Cl.
*B25H 3/02* (2006.01)

(52) U.S. Cl.
CPC .................................... *B25H 3/023* (2013.01)

(58) Field of Classification Search
CPC .......... B25H 3/003; B25H 3/02; B25H 3/023; B25H 3/025; B25H 3/021

(Continued)

(56) References Cited

U.S. PATENT DOCUMENTS

| | | | |
|---|---|---|---|
| 2,341,635 | A | 2/1944 | Loesch |
| D171,132 | S | 12/1953 | Hudson |

(Continued)

FOREIGN PATENT DOCUMENTS

| | | | |
|---|---|---|---|
| CN | 103372858 | A | 10/2013 |
| CN | 206326579 | U | 7/2017 |

(Continued)

OTHER PUBLICATIONS

Extended European Search Report for Application No. 19859376.6 dated May 3, 2022 (9 pages).

(Continued)

*Primary Examiner* — Steven A. Reynolds
*Assistant Examiner* — Prince Pal
(74) *Attorney, Agent, or Firm* — Michael Best & Friedrich LLP

(57) ABSTRACT

A storage case includes a base including a lower surface, walls extending from the lower surface, and a plurality of recesses arranged in a grid adjacent the lower surface. The lower surface and the walls define a cavity, and each recess has a double bayonet shape defining a partially circular shape with a pair of bayonet channels. The storage case further includes a peg positioned within the cavity and having an elongated body configured to support a tool accessory. The elongated body has a first end and a second end opposite the first end, and the first end includes a bayonet projection. The bayonet projection is alternately receivable in each of plurality of recesses by a bayonet style coupling, and the peg is orthogonal to the lower surface of the base when coupled to each of the plurality of recesses.

13 Claims, 19 Drawing Sheets

Related U.S. Application Data

(60) Provisional application No. 62/728,891, filed on Sep. 10, 2018.

(58) Field of Classification Search
USPC ................. 206/346, 372, 373, 379, 108, 6.1
See application file for complete search history.

(56) References Cited

U.S. PATENT DOCUMENTS 3,804,234 A * 4/1974 Gordon .................... B65D 5/50 229/185.1
3,878,939 A 4/1975 Wilcox
4,033,455 A * 7/1977 Robison ................. B65D 71/70 206/595
4,253,830 A 3/1981 Kazen et al.
4,424,899 A 1/1984 Rosenberg
4,798,292 A * 1/1989 Hauze ....................... A61L 2/26 206/439
4,871,354 A 10/1989 Conn et al.
5,047,019 A * 9/1991 Sincock .............. A61M 5/3213 206/486
D323,245 S 1/1992 Hobson
5,133,455 A 7/1992 Chow
5,165,539 A * 11/1992 Weber ....................... A61L 2/26 206/439
D335,434 S 5/1993 Someya
5,207,325 A * 5/1993 Kennedy ................... A61L 2/06 206/370
5,353,930 A * 10/1994 Berry, Jr. ................ B29C 51/14 206/439
D351,994 S 11/1994 Kalvelage
5,398,810 A 3/1995 Yao Wang
5,407,648 A * 4/1995 Allen ........................ A61L 2/26 422/292
5,424,048 A * 6/1995 Riley ..................... A61B 50/33 206/370
5,464,091 A 11/1995 Callahan et al.
5,540,901 A * 7/1996 Riley ..................... A61B 50/22 206/370
5,570,784 A 11/1996 Sidabras et al.
5,676,254 A 10/1997 Cheng et al.
5,762,211 A * 6/1998 Ensign .................. A47F 5/0861 211/70.6
5,766,561 A * 6/1998 Frieze ....................... A61L 2/26 206/370
D397,246 S 8/1998 Hoofnagle et al.
5,823,332 A * 10/1998 Clausen ............. G11B 33/0433 211/41.12
5,826,719 A 10/1998 Chen
5,843,387 A * 12/1998 Dane ......................... A61L 2/26 206/483
5,855,274 A * 1/1999 Piao ......................... B25H 3/04 206/478
6,109,436 A 8/2000 He
6,213,296 B1 4/2001 Streich et al.
6,331,280 B1 * 12/2001 Wood ........................ A61L 2/26 206/268
6,391,260 B1 * 5/2002 Davis ...................... A61L 2/208 206/370
6,405,864 B1 6/2002 Streich et al.
6,415,922 B1 7/2002 Lee
6,470,930 B1 10/2002 Stottmann
6,634,728 B1 10/2003 Leguin
D482,255 S 11/2003 Winig et al.
D488,300 S 4/2004 Lopez
6,755,302 B1 6/2004 Streich et al.
D494,035 S 8/2004 Winig et al.
D494,036 S 8/2004 Winig et al.
D495,067 S * 8/2004 Winig .......................... D25/138
6,769,538 B2 8/2004 Oswald
D498,005 S * 11/2004 Winig .......................... D25/152
D501,125 S 1/2005 Winig et al.
6,953,114 B2 10/2005 Wang
6,991,103 B2 1/2006 Chen
7,048,133 B2 5/2006 Pangerc et al.
D545,160 S 6/2007 Lee
7,246,704 B2 7/2007 Brunson et al.
7,341,148 B2 * 3/2008 Bettenhausen ........... A61L 2/18 206/439
7,434,688 B2 10/2008 Hu
7,601,312 B2 * 10/2009 Riley ..................... A61B 50/33 248/684
7,900,771 B1 3/2011 Meng
7,931,143 B1 4/2011 Lin
7,946,418 B1 * 5/2011 Cerynik ................. B25H 3/021 206/362
D645,322 S 9/2011 Hamm et al.
8,069,984 B2 12/2011 Larson et al.
8,235,212 B2 8/2012 Heerens
8,251,211 B1 8/2012 Chen et al.
8,336,708 B2 * 12/2012 Potterfield ............... B25H 3/02 206/459.5
8,371,444 B1 * 2/2013 Huang ................... B25H 3/003 206/374
D679,908 S 4/2013 Hurt et al.
8,505,720 B2 8/2013 Huang
8,915,363 B2 * 12/2014 Hawkes ............... A61C 19/002 206/370
D725,388 S 3/2015 Cole
8,992,229 B2 3/2015 Spital
9,132,932 B2 * 9/2015 Scharfe .................. A47G 19/02
9,156,156 B2 10/2015 Wang
9,156,157 B2 10/2015 Wang
RE45,787 E * 11/2015 Hurt ............................... D3/294
9,198,811 B2 * 12/2015 Pizzato ................... A61F 17/00
9,254,565 B1 2/2016 Wang
D757,435 S 5/2016 Damberg
9,375,835 B1 6/2016 Lin
9,421,685 B2 8/2016 Meyers
9,486,912 B1 11/2016 Chen
9,610,126 B2 * 4/2017 Griffin ................... A61B 50/20
9,636,429 B2 * 5/2017 Cushion ................. A61B 50/34
9,656,384 B1 5/2017 Tsai
9,694,489 B2 7/2017 Steele et al.
D814,567 S 4/2018 Franklin
9,975,237 B2 * 5/2018 Norris ...................... B25H 3/06
10,058,230 B2 * 8/2018 Gobl .................. B65D 19/0002
10,266,305 B2 * 4/2019 Lee ........................ B65D 43/02
10,286,541 B2 * 5/2019 Huang ............... B65D 21/0219
10,629,335 B2 * 4/2020 Rouleau ........... H01B 13/01209
10,772,447 B2 * 9/2020 Roaks .................... A47G 19/10
10,898,821 B2 * 1/2021 Poulus ................. A63H 33/086
D928,630 S 8/2021 Liu
11,358,272 B2 * 6/2022 Bühl ...................... B25H 3/021
11,369,216 B2 * 6/2022 Fleega .................. A47F 5/0823
11,504,994 B1 * 11/2022 Leinbach ............... B43K 23/06
D981,811 S 3/2023 Spears
2003/0180105 A1 * 9/2003 Hsiao ..................... B25H 3/003 407/120
2003/0213876 A1 * 11/2003 Takeuchi ................. H05K 7/12 248/74.1
2003/0221984 A1 * 12/2003 Huang ..................... B25H 3/02 206/372
2004/0134818 A1 * 7/2004 Cunningham ......... B25H 3/023 206/373
2005/0133394 A1 * 6/2005 Liu ........................ A45C 11/00 206/349
2005/0211587 A1 9/2005 Chen
2005/0241974 A1 11/2005 Chen
2006/0011624 A1 1/2006 Shih
2006/0070900 A1 * 4/2006 Brunson ................ B25H 3/003 206/372
2007/0272572 A1 11/2007 Chen
2008/0060960 A1 3/2008 Hu
2009/0146032 A1 6/2009 Bettenhausen et al.
2009/0288974 A1 * 11/2009 Pistor ..................... B25H 3/003 206/377
2010/0140126 A1 6/2010 Lu et al.
2011/0031145 A1 2/2011 Larson et al.
2011/0111378 A1 5/2011 Nguyen
2011/0233096 A1 9/2011 Michels et al.

(56) References Cited

U.S. PATENT DOCUMENTS

| | | | | |
|---|---|---|---|---|
| 2011/0290697 | A1* | 12/2011 | Dalhamer | A47G 23/06 206/557 |
| 2012/0043238 | A1 | 2/2012 | Christopher | |
| 2014/0166516 | A1 | 6/2014 | Martinez et al. | |
| 2014/0231307 | A1 | 8/2014 | Wen | |
| 2014/0340034 | A1 | 11/2014 | Dietzel et al. | |
| 2015/0258676 | A1 | 9/2015 | Wang | |
| 2015/0258677 | A1 | 9/2015 | Wang | |
| 2016/0052125 | A1 | 2/2016 | Steele et al. | |
| 2016/0053987 | A1 | 2/2016 | Hsu | |
| 2016/0075010 | A1* | 3/2016 | Gonzales | B25H 3/021 206/349 |
| 2016/0107308 | A1* | 4/2016 | Hsu | B25H 3/003 206/349 |
| 2016/0290013 | A1 | 10/2016 | Lin | |
| 2016/0346915 | A1 | 12/2016 | Lin | |
| 2017/0165829 | A1* | 6/2017 | Damberg | A45C 13/02 |
| 2017/0259424 | A1* | 9/2017 | Vetter | H02J 7/0044 |
| 2017/0341218 | A1* | 11/2017 | Maruzzo | A47B 88/994 |
| 2017/0361454 | A1* | 12/2017 | Hsu | B25H 3/003 |
| 2018/0250759 | A1* | 9/2018 | Hyma | B25G 1/10 |
| 2019/0351540 | A1* | 11/2019 | Lamb | B25H 3/023 |
| 2020/0039057 | A1 | 2/2020 | Bühl et al. | |
| 2020/0180138 | A1* | 6/2020 | D'Alessandro | B25H 3/00 |
| 2020/0200340 | A1 | 6/2020 | Pugh et al. | |
| 2020/0238501 | A1 | 7/2020 | Baum | |
| 2021/0078159 | A1* | 3/2021 | Jiang | B65D 21/0213 |
| 2021/0146525 | A1 | 5/2021 | Spaulding, Jr. et al. | |
| 2021/0197360 | A1 | 7/2021 | Zhang | |
| 2021/0245358 | A1 | 8/2021 | Hohl et al. | |
| 2021/0387325 | A1* | 12/2021 | Heath | B25H 3/023 |
| 2022/0355464 | A1* | 11/2022 | La Vardera | B25H 3/003 |
| 2023/0141683 | A1* | 5/2023 | Burns | A45C 13/02 206/373 |
| 2023/0150293 | A1* | 5/2023 | Leinbach | B43K 23/04 206/214 |

FOREIGN PATENT DOCUMENTS

| | | | |
|---|---|---|---|
| DE | 202015100103 | U1 | 2/2015 |
| EP | 2551067 | B1 | 5/2016 |
| KR | 2019950010112 | Y1 | 11/1995 |
| RU | 00137828 | | 8/2023 |
| WO | 0009421 | A1 | 2/2000 |
| WO | 2018007962 | A1 | 1/2018 |

OTHER PUBLICATIONS

Ikea, "SKADIS Pegboard, black, 30x22," <https://www.ikea.com/us/en/p/skadis-pegboard-black-50534378/?> web page visited Sep. 5, 2023 (3 pages).

ToolGuyd, "Milwaukee 20pc Oscillating Multi-Tool Accessory Kit with New Customizable Case," <https://toolguys.com/milwaukee-20pc-oscillating-multi-tool-blades-h2021/> web page visited Sep. 5, 2023 (3 pages).

Kole Imports and Closeouts, "Deisgn-Your-Own Peg Board Storage Set with Containers and Hooks," <https://koleimports.com/peg-board-storage-board-set-hc501?gad=1&> web page visited Sep. 5, 2023 (3 pages).

Chinese Patent Office Action for Application No. 201980059275.3 dated Sep. 28, 2023 (23 pages including machine English translation).

Chinese Patent Office Action for Application No. 201980059275.3 dated Feb. 22, 2024 (22 pages including machine English translation).

International Search Report and Written Opinion for Application No. PCT/US2019/050168 dated Dec. 27, 2019 (10 pages).

Bosch, "Bosch 2608580871 Hole Saw Set Speed for Multi-Construction (9-Piece)" <https://www.amazon.co.uk/Bosch-2608580871-Speed-Multi-Construction-9-Piece/dp/B00OWMC13E/ref . . . > web page publicly available at least as early as Jan. 22, 2018.

* cited by examiner

MODULAR TOOL CONTAINER

CROSS-REFERENCE TO RELATED APPLICATION

This application is a continuation of U.S. patent application Ser. No. 17/269,286, filed Feb. 18, 2021, now U.S. Pat. No. 11,717,954, which is a national phase filing under 35 U.S.C. 371 of International Application No. PCT/US2019/050168, filed Sep. 9, 2019, which claims priority to U.S. Provisional Patent Application No. 62/728,891, filed Sep. 10, 2018, the entire contents of all of which are incorporated herein by reference.

FIELD

The present disclosure relates to a tool container or case, and more specifically, to a tool container or case with modular components allowing for user customization.

SUMMARY

In one aspect, a container includes a base, first recesses, a lid, and an insert. The base includes a lower surface. Base walls extend from the lower surface. The lower surface and the base walls define a cavity. The first recesses are positioned adjacent to the lower surface. The lid is movably coupled to the base to selectively enclose the cavity. The lid includes an upper surface and lid walls that extend from the upper surface. The insert is positioned within the cavity and removably coupled to the lower surface of the base. The insert includes a projection received within one of the first recesses. The insert is engaged by the lid when the lid is closed.

In another aspect, a container includes a base with a lower surface and base walls extending from the lower surface, a hinge pivotably coupled to the base, and a lid pivotably coupled to the hinge. The lower surface and the base walls define a cavity. The lid selectively encloses the cavity. The lid includes an upper surface and lid walls extending from the upper surface. The hinge is rotatable relative to the base about a first axis, and the lid is rotatable relative to the hinge about a second axis parallel to and spaced apart from the first axis. The lid is movable between a first position, in which the lid encloses the cavity, and a second position, in which the base rests on the lid.

In yet another aspect, a container includes a base, first recesses, a hinge, a lid, and an insert. The base includes a lower surface, base walls that extend from the lower surface, and a cavity defined by the lower surface and the base walls. The first recesses are positioned adjacent to the lower surface. The hinge is pivotably coupled to the base. The lid is pivotably coupled to the hinge to selectively enclose the cavity. The insert is positioned within the cavity. The insert includes a projection received within one of the first recesses. The lid is movable between a first position, in which the lid encloses the cavity, and a second position, in which the base rests on the lid. The lid engages the insert when the lid is in the first position.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a container for storing tools. Modular components couple to the container and allow a user to store the tools in a variety of positions within the container. The container also includes a lid that is movable from a first position on top of the container, to a second position underneath the container.

Figure 1:
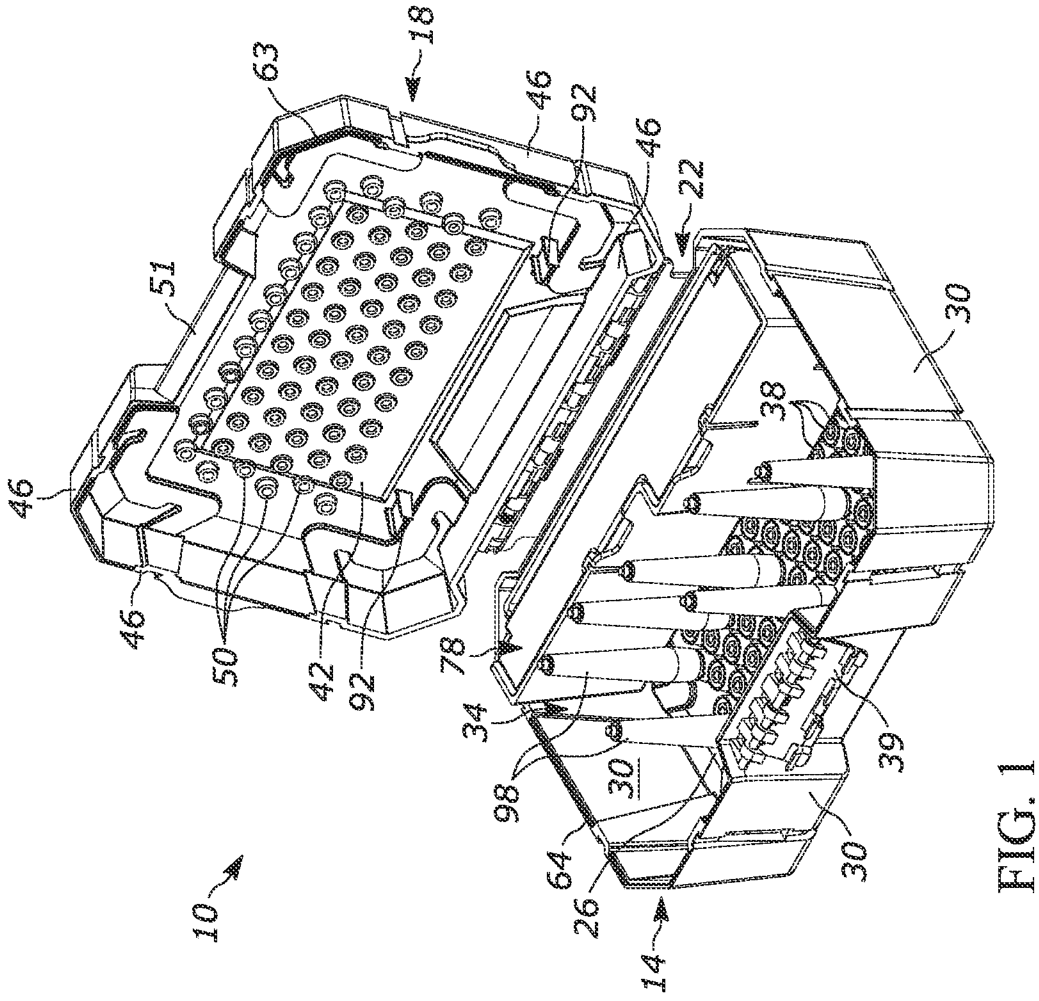
FIG. 1 is a perspective view of a tool container.
Figure 2:
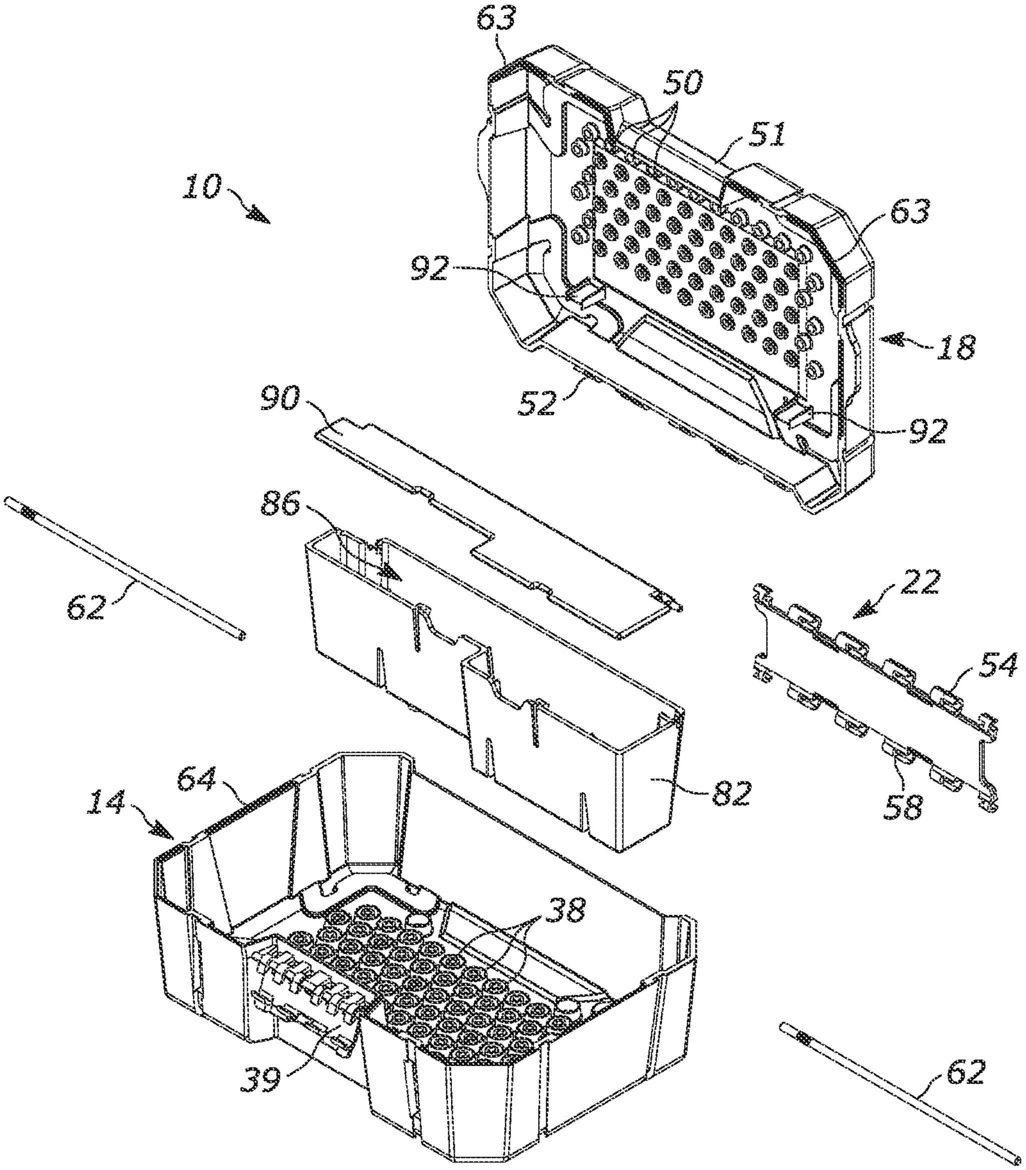
FIG. 2 is an exploded view of the tool container of FIG. 1.

As shown in FIGS. 1 and 2, a tool container or case 10 includes a base 14 coupled to a lid 18 by a hinge 22. The base 14 includes a first or lower surface 26 and walls 30 extending from the lower surface 26 and defining a cavity 34. In some embodiments, a handle (not shown) is coupled to at least one of the walls 30 or to the lid 18. The case 10 also includes recesses 38 positioned adjacent to the lower surface 26. In the illustrated embodiment, the recesses 38 are formed directly on the lower surfaces 26. The recesses 38 are generally circular in shape and each recess 38 includes an inner projection 41 (FIG. 3) that is spaced from the outer boundary of the recess 38. The recesses 38 are arranged in rows along the lower surface 26. In the illustrated embodiment, each row of recesses 38 is offset from adjacent rows of recesses 38.

Figure 3:
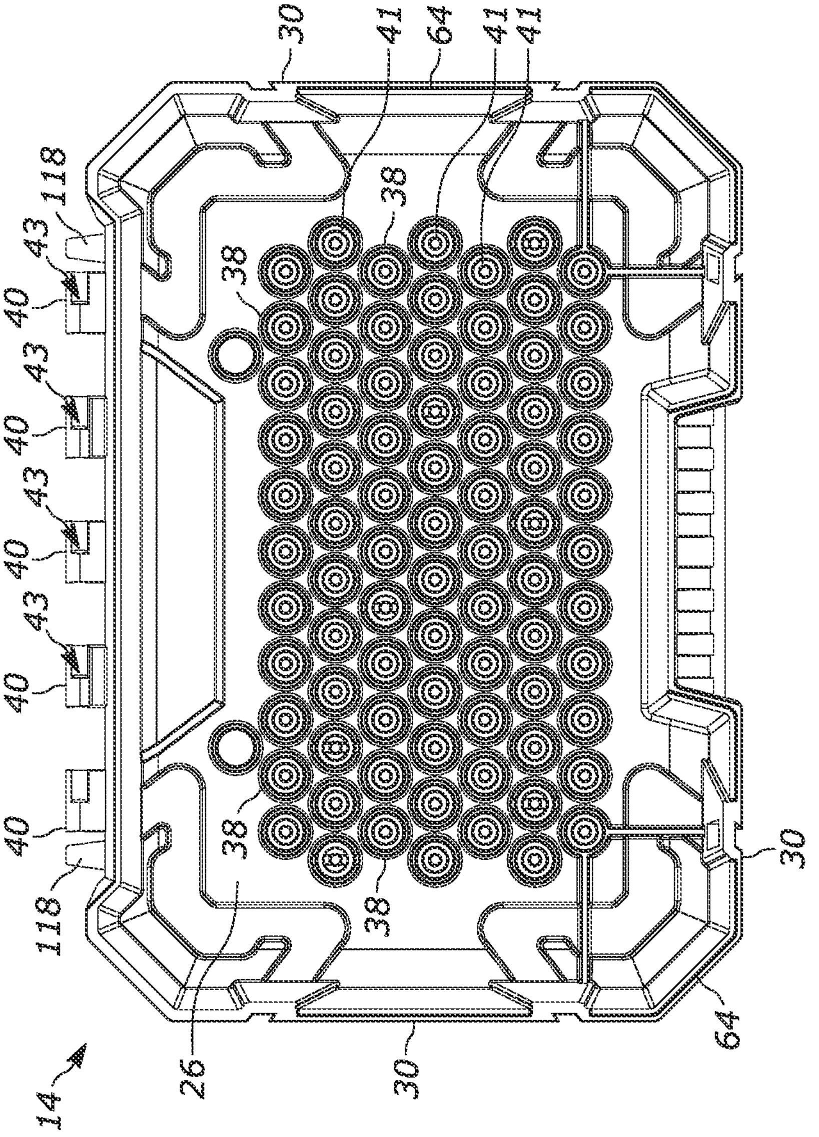
FIG. 3 is a top view of a base of the tool container of FIG. 1.

The base 14 also includes a first locking member or latch 39 and a first receiving portion 40. In the illustrated embodiment, the latch 39 is disposed on one wall 30, and the first receiving portion 40 is disposed on another wall 30 opposite wall 30 containing the latch 39. The latch 39 is movable (e.g., slidable, pivotable, detachable, etc.) relative to the wall 30. As shown in FIG. 3, the first receiving portion 40 includes a series of openings 43 for coupling to the hinge 22. Centers of the openings are aligned along an axis. In the illustrated embodiment, feet 118 are disposed on either side of the first receiving portion 40. The feet 118 have a triangular profile. The feet 118 inhibit the base 14 from tipping over.

Figure 10:
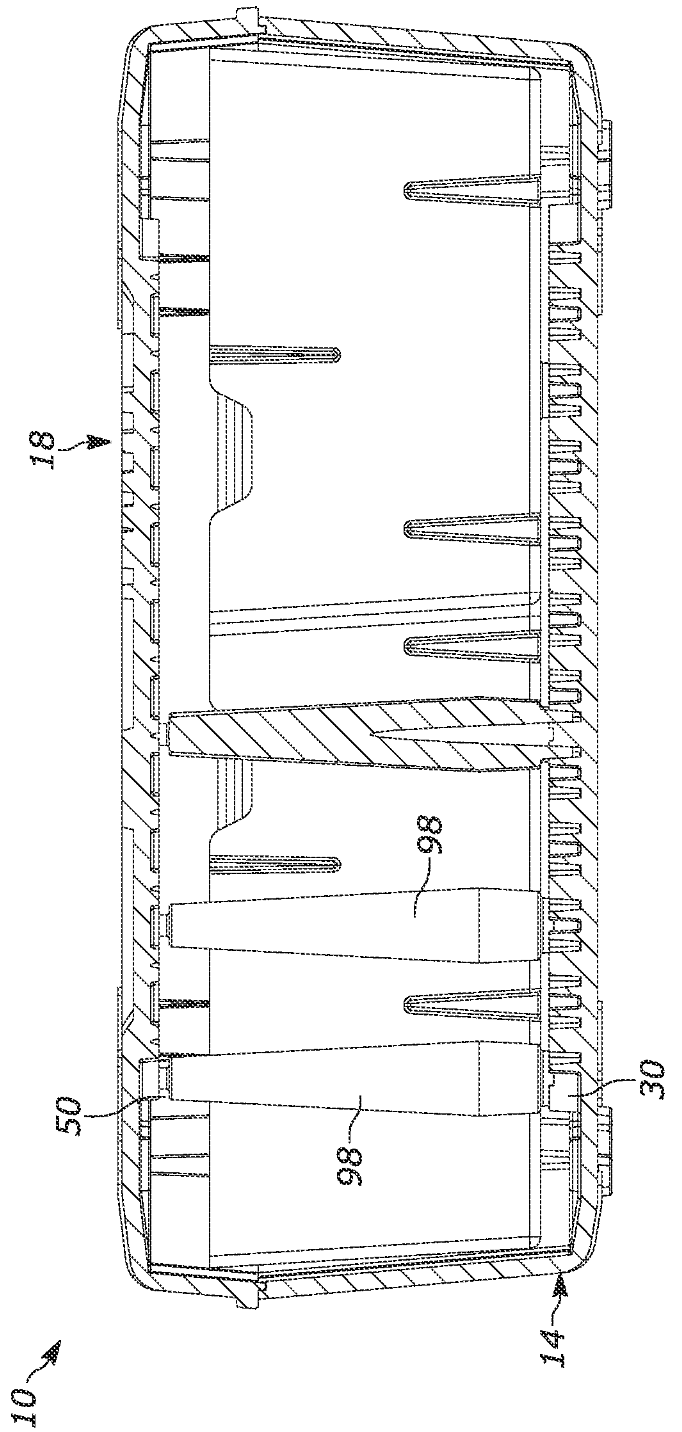
FIG. 10 is a cross-sectional view of the tool container with the lid in the closed position.

Returning to FIGS. 1 and 2, the lid 18 includes a first or upper surface 42 and walls 46 extending from the upper surface 42. The upper surface 42 includes recesses 50. In the illustrated embodiment, the recesses 50 are circular in shape and have a smaller diameter than the recesses 38. The recesses 50 are also arranged in rows along the upper surface 42. In the illustrated embodiment, each row of recesses 50 is offset from adjacent rows of recesses 50. When the lid 18 is closed (FIGS. 4 and 10), the recesses 50 of the lid 18 are substantially aligned with the recesses 38 of the base 14. In some embodiments, the recesses 50 also assist in the injection molding process, by eliminating the need for long core pins.

The lid 18 also includes a second locking member 51 and a second receiving portion 52. In the illustrated embodiment, the second locking member 51 is disposed on one wall 46, and the second receiving portion 52 is disposed on an opposite wall 46 from the second locking member 51. The second locking member 51 includes a projection that is fixed relative to the wall 46. The latch 39 selectively engages the second locking member 51 to secure the lid in a closed position. In the illustrated embodiment, the second receiving portion 52 includes a series of openings for coupling to the hinge 22. Centers of the openings are aligned along an axis.

The hinge 22 is an elongated body. In the illustrated embodiment, the hinge 22 is substantially rectangular in shape. A third receiving portion 54 is disposed along a first edge of the hinge 22, and a fourth receiving portion 58 is disposed along a second edge of the hinge 22 opposite the first edge. In the illustrated embodiment, the receiving portions 54, 58 include series of aligned openings. Centers of the openings of the third receiving portion 54 and centers of the openings of the fourth receiving portion 58 are each aligned along respective axes.

The first receiving portion 40 is aligned with the third receiving portion 54, and the second receiving portion 52 is aligned with the fourth receiving portion 58 (i.e., the centers of the series of openings making up the third and fourth receiving portions 54, 58 are aligned with the centers of the series of openings of the first and second receiving portions 40, 52 respectively). Rods or pins 62 are received in the adjacent receiving portions (e.g., the first and third receiving portions 40, 54 and the second and fourth receiving portions 52, 58). The rods 62 rotatably couple the hinge 22 to the base 14 and the lid 18.

Figure 4:
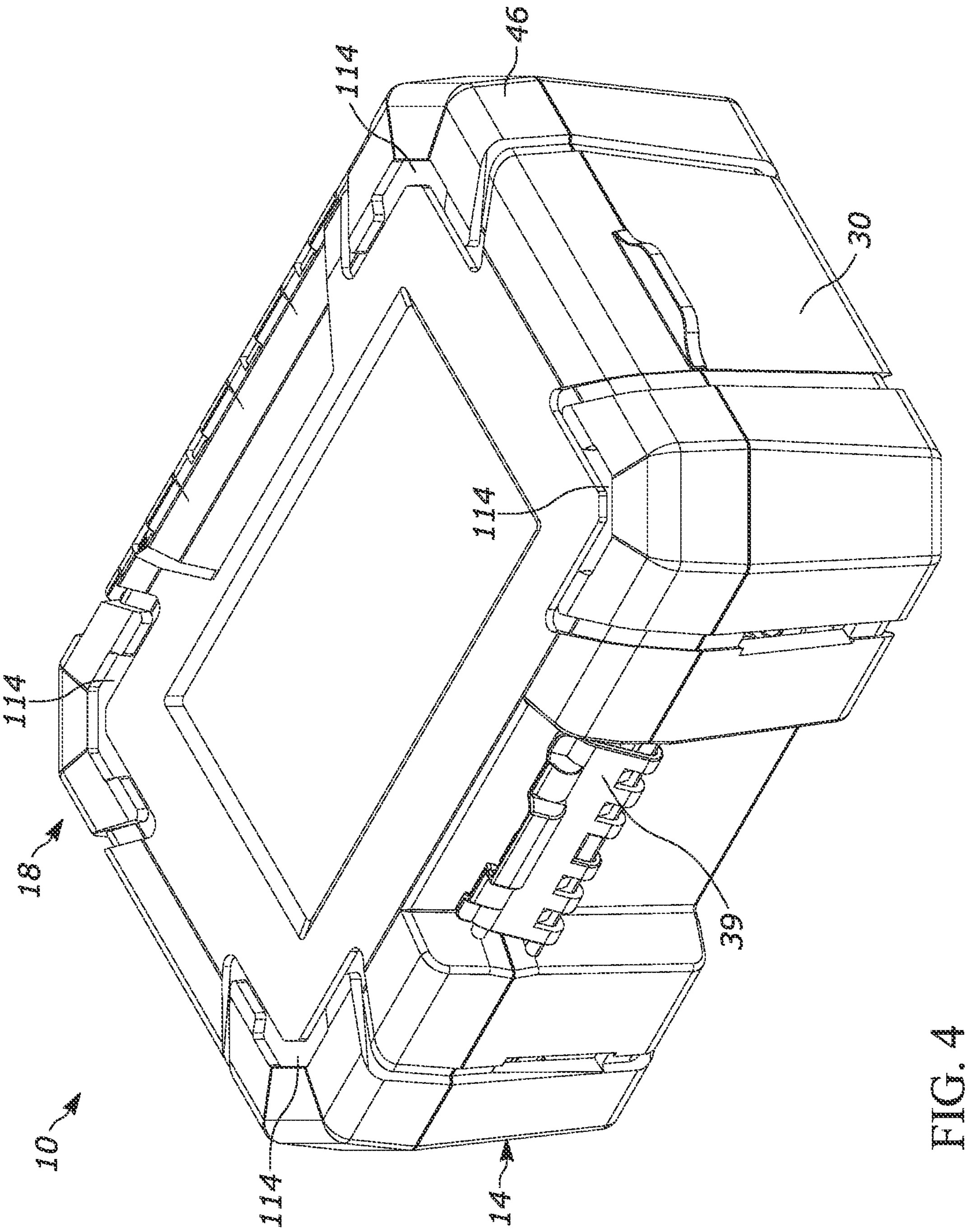
FIG. 4 is a perspective view of the tool container of FIG. 1, with a lid in a closed position.
Figure 5:
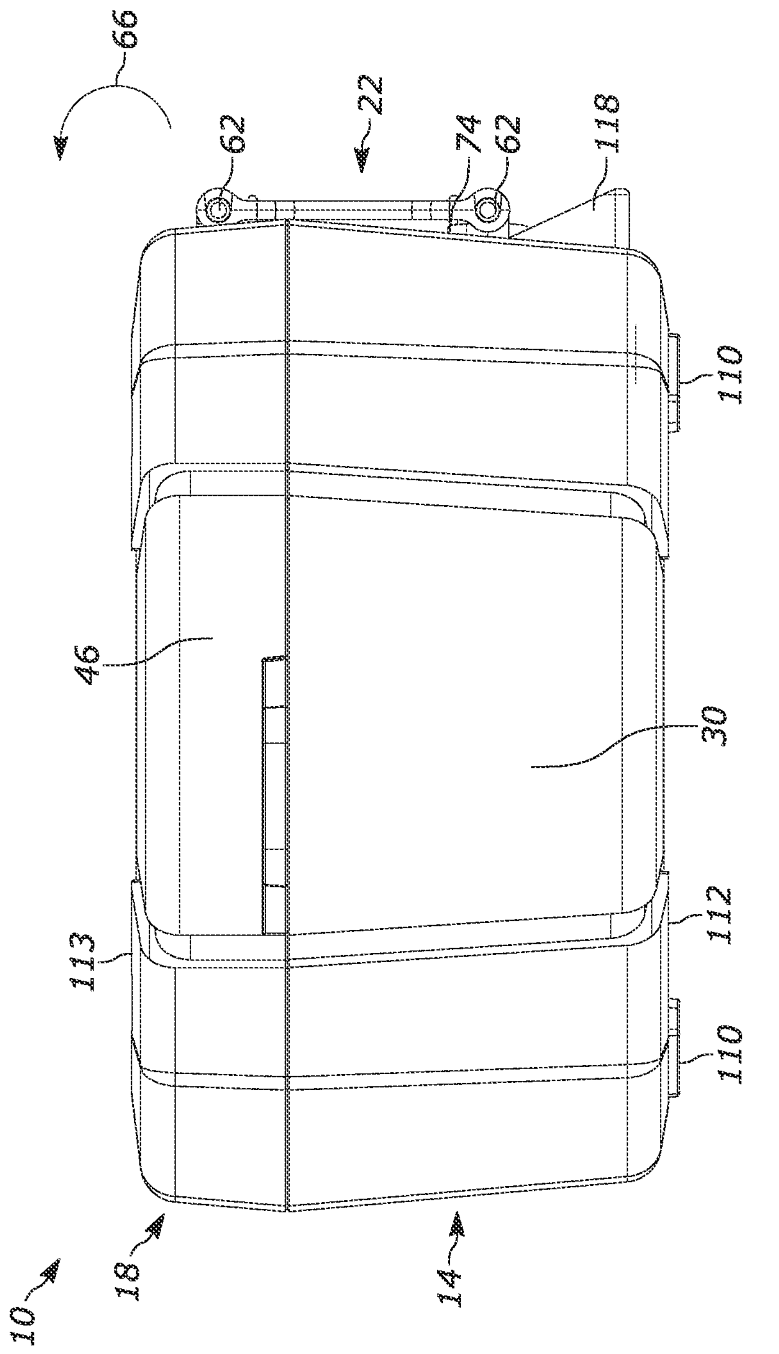
FIG. 5 is a side view of the tool container of FIG. 4.

As shown in FIGS. 4 and 5, the lid 18 is movable relative to the base 14 to a first or closed position. The hinge 22 is pivotable relative to the base 14, and the lid 18 is pivotable relative to the hinge 22. Both the hinge 22 and the lid 18 pivot in a first rotational direction identified by arrow 66 (e.g., counterclockwise in FIG. 5). In the illustrated embodiment, the hinge 22 is pivotable to a substantially vertical position, and the lid 18 is pivotable to a substantially orthogonal position relative to the hinge 22. In the illustrated embodiment, the base 14 includes stops 74 (FIG. 5), which extend from one of the walls 30. The hinge 22 pivots in the first rotational direction 66 toward the stops 74, and may pivot up to contacting the stops 74. The stops 74 prevent the hinge 22 from being acute with respect to the wall 30. In the closed position, the walls 46 of the lid 18 contact the walls 30 of the base 14. The two sets of walls 30, 46 interlock and help secure the case 10 in the event that the case 10 is dropped. In particular, the illustrated wall 46 includes a protrusion or projection 63 formed on a lower edge of the wall 46, while the illustrated wall 30 includes a gap or recess 64 formed in an upper edge of the wall 30. The recess 64 receives the projection 63 to form the interlock between the walls 30, 46. In other embodiments, the locations of the projection 63 and the recess 64 may be reversed, or the walls 30, 46 may include other features for creating an interlock between the walls 30, 46. In the illustrated embodiment, when the lid 18 is closed, the lower surface 26 faces the upper surface 42, and the recesses 38 are aligned with the recesses 50 (FIG. 1).

Before the lid 18 is closed, the latch 39 is moved along the wall 30, providing clearance for the second locking member 51. Once the lid is closed 18, the latch 39 is moved back along the wall 30 to engage the second locking member 51, thereby securing the lid 18 to the base 14. In some embodiments, the latch 39 may include a biasing member (e.g., a spring) to bias the latch 39 into engagement with the locking member 51. Additionally or alternatively, in some embodiments, the latch 39 may be pivotable relative to the wall 30 to engage and disengage the locking member 51. In further embodiments, other suitable types of latches may be used. In the illustrated embodiment, the lid 18 completely covers the cavity 34 in the closed position.

Figure 6:
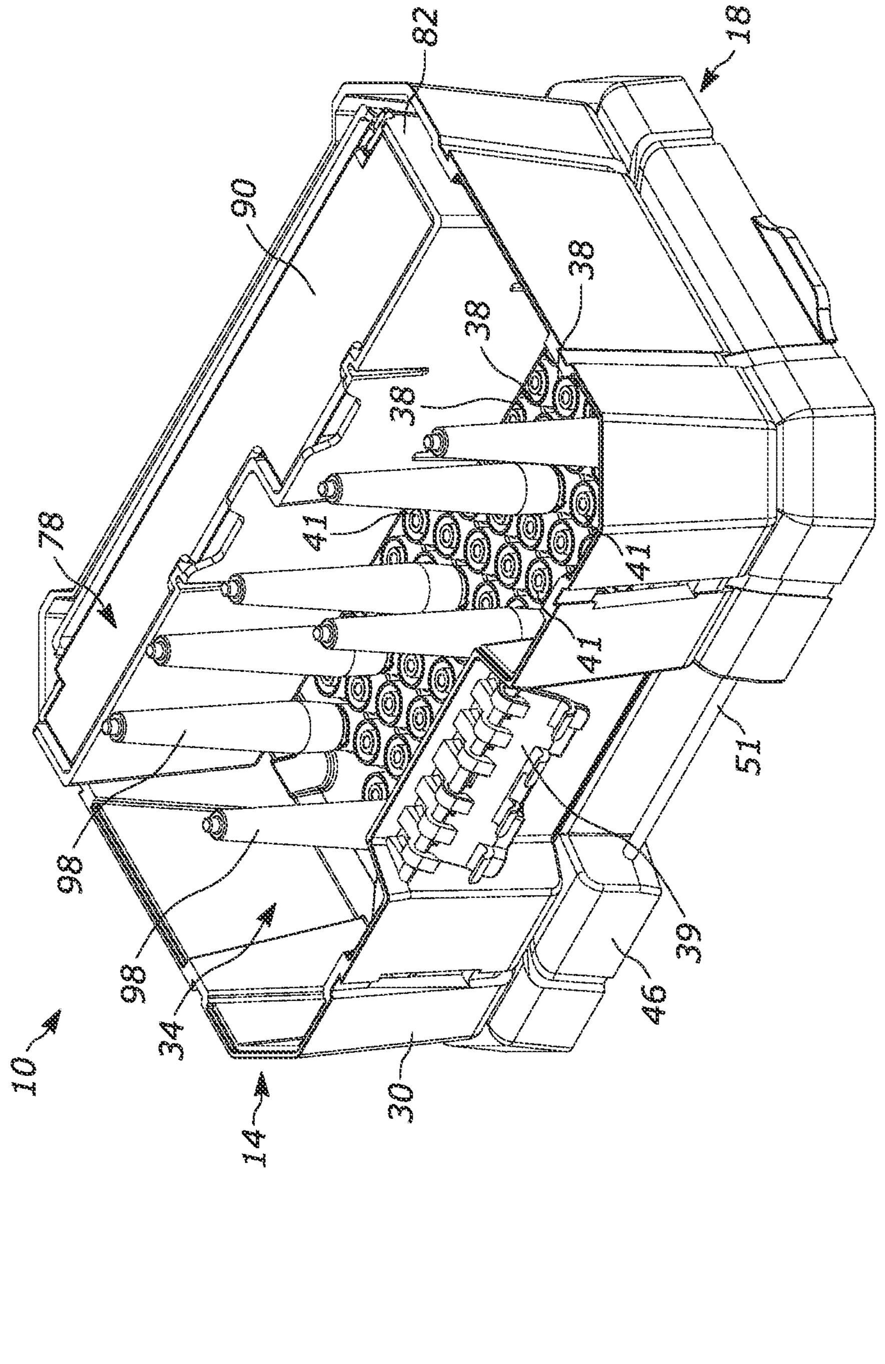
FIG. 6 is a perspective view of the tool container of FIG. 1, with the lid in an opened position.
Figure 7:
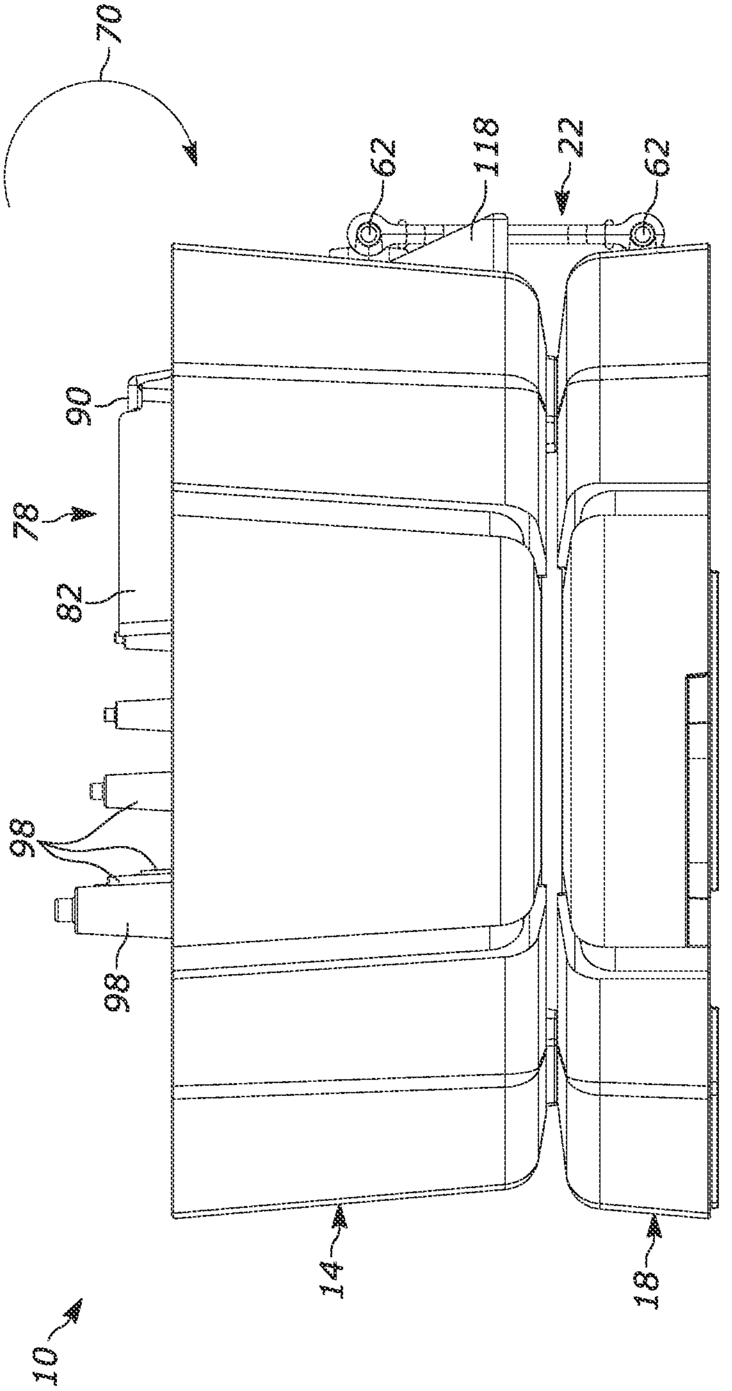
FIG. 7 is a side view of the tool container of FIG. 6, with the lid positioned beneath a base of the tool container.

As shown in FIGS. 6 and 7, the lid 18 is also movable relative to the base 14 to a second or fully open position. The hinge 22 and the lid 18 pivot in a second rotational direction identified by arrow 70 (e.g., clockwise in FIG. 7), which is opposite the first rotational direction 66 (FIG. 5). The lid 18 pivots in the second rotational direction 70 and allows the base 14 to rest on top of the lid 18 (i.e., the lower surface 26 faces in an opposite direction as the upper surface 42). In the illustrated embodiment, an outer surface 112 the base 14 opposite the lower surface 26 includes projections or feet 110 disposed proximate corners of the base 14 (FIG. 5). An outer surface 113 of the lid 18 opposite the upper surface 42 includes complementary depressions 114 (FIG. 4). The feet 110 mate with the depressions 114 when the base 14 rests on top of the lid 18, securing (e.g., via an interference fit) the lid 18 to the base 14 until the two are moved (e.g., pulled) apart by a user.

In the open position, the cavity 34 is unobstructed (i.e., the lid 18 and the hinge 22 are not blocking the cavity 34). While in this position, a user may access the cavity 34 along any of the walls 30. In other situations (not shown), a user may not need to move the lid 18 to the fully open position, and may pivot the hinge 22 and the lid 18 in the second rotational direction 70 so that the lid 18 is spaced apart from the base 14, but that the base 14 does not rest on top of the lid 18. The fully open position, however, is also useful when displaying the case 10 in, for example, a store. The case 10 may be packaged (e.g., in a clear blister pack) while in the fully open position so that potential purchasers can see into the case prior to buying.

Figure 8:
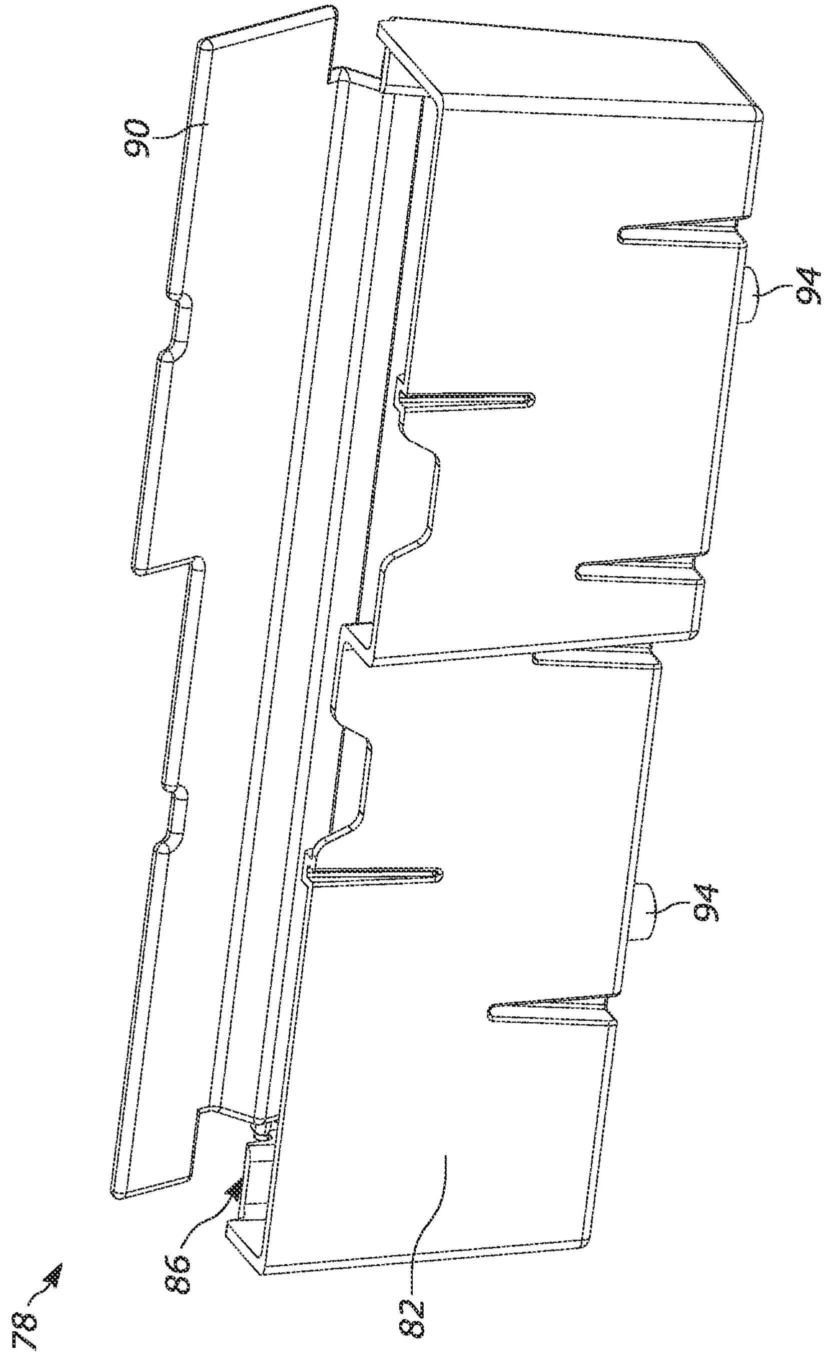
FIG. 8 is a perspective view of an insert for the tool container of FIG. 1.

The case 10 is used to store tools and tool accessories. For example, in the illustrated embodiment, the case 10 may be used to store hole saws and arbors. As shown in FIGS. 1 and 8, one or more first inserts are positioned within the cavity 34. In the illustrated embodiment, the first inset is an arbor box 78. The arbor box 78 includes a base 82 defining a compartment or cavity 86, a cover 90, and posts or pins 94. The cover 90 is movable (e.g., pivotable) relative to the base 82 and selectively covers the cavity 86 (FIG. 8). When the lid 18 is in the closed position (FIG. 4), the cover 90 is unable to open and expose the cavity 86. The lid 18 also includes two lugs 92 (FIG. 1), which engage the cover 90 when the lid 14 is in the closed position. The lugs 92 inhibit the cover 90 from opening in the event the case 10 is dropped. In the illustrated embodiment, the arbor box 78 includes two pins 94. The pins 94 are receivable in any of the recesses 38. A user may reposition the arbor box 78 anywhere within the case 10 by positioning the pins 94 within different recesses. Additional arbor boxes (not shown) may also be positioned within the case 10. The arbor box 78 is configured to store the arbor.

Figure 9:
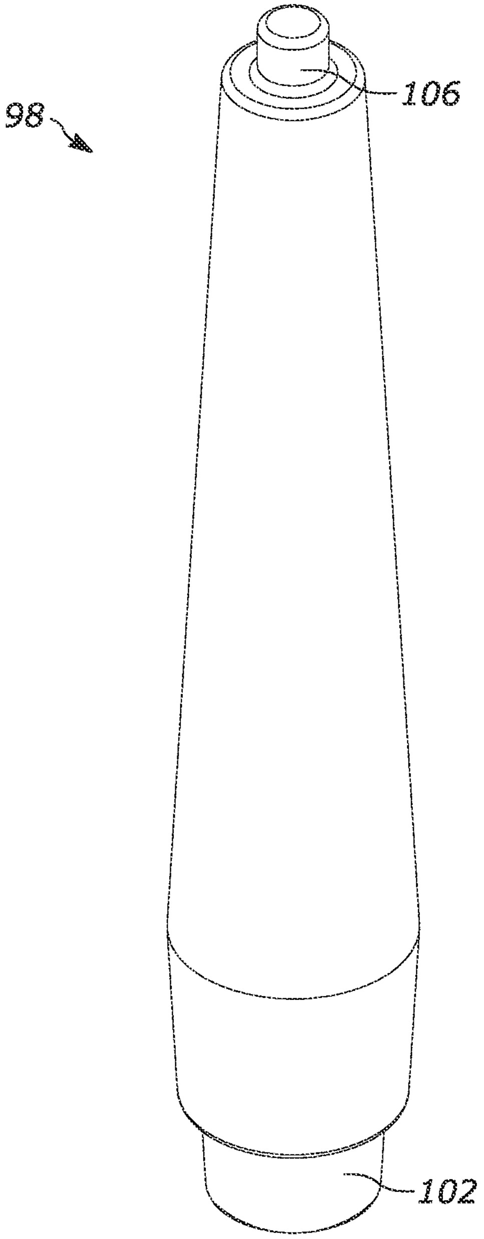
FIG. 9 is a perspective view of a pin.

As shown in FIGS. 1 and 9, one or more second inserts are also positioned within the cavity 34. In the illustrated embodiment, the second inserts are pegs 98. Each of the illustrated pegs 98 has an elongated body with a first end 102 and a second end 106. The first end 102 is larger (e.g., wider) than the second end 106. Each peg 98 is also tapered from the first end 102 to the second end 106 such that the pegs 98 are generally frustoconically-shaped. The first end 102 is positionable in any of the recesses 38 and mates with both the inner projection 41 and an outer diameter of the recess 38. The pegs 98 are configured to hold hole saws. For example, the hole saws slide over the second end 106 and onto one of the pegs 98. In some scenarios, the pegs 98 are configured to hold one or more hole saws with different diameters in stacked configurations. Moving the pegs 98 to different recesses 38 allows a user to store the hole saws in different configurations within the case 10.

When the lid 18 is in the closed position (FIG. 10), the second end 106 of the peg 98 is received within the recess 50 of the lid 18 that is aligned with the recess 38 of the base 14 in which the peg 98 is positioned. The peg 98 is then coupled to both the base 14 and the lid 18 and is unable to move relative to either. Any hole saws positioned on the pegs 98 are unable to fall off the pegs 98 while the lid 18 is in the closed position. The pegs 98 also would not come loose if the case 10 was dropped because the pegs 98 are coupled to the base 14 and the lid 18 at both ends 102, 106.

Figure 11:
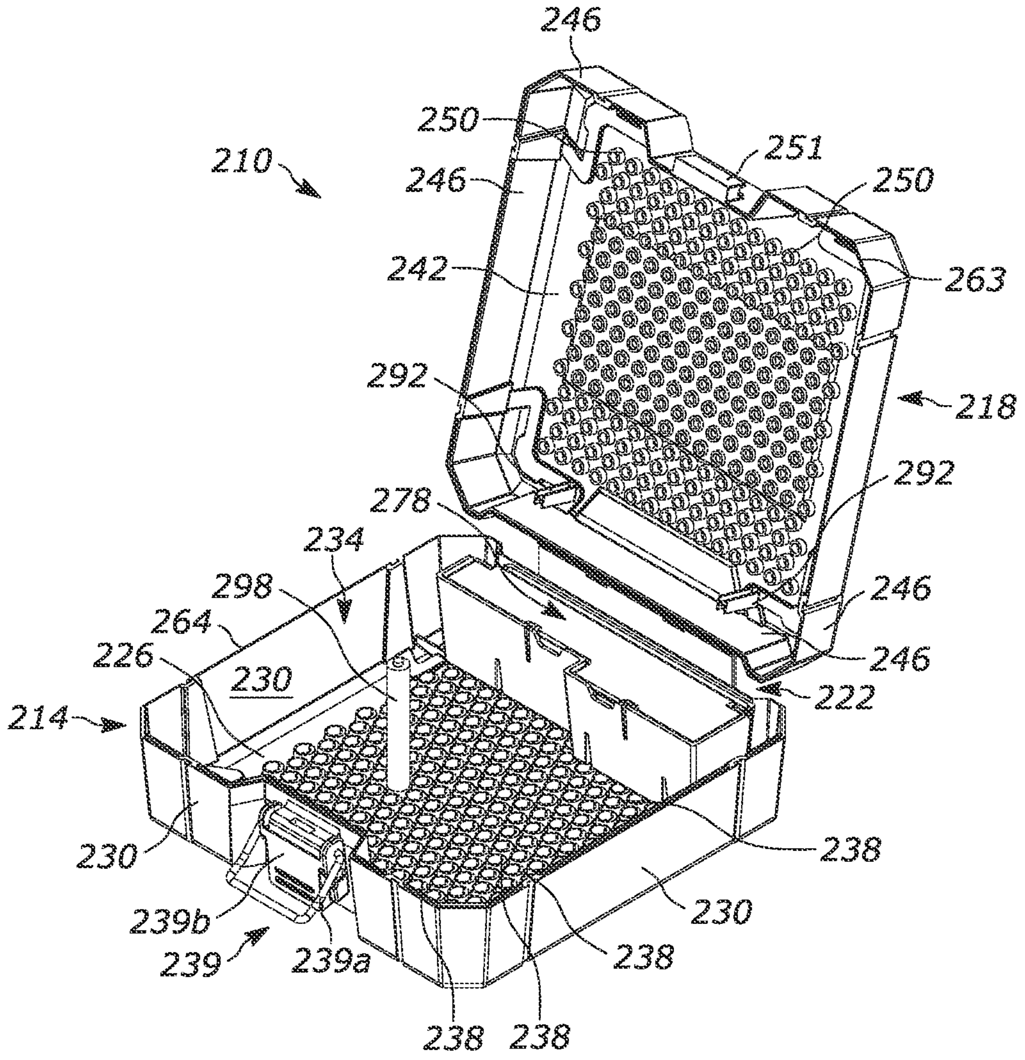
FIG. 11 is a perspective view of a tool container according to another embodiment.
Figure 12:
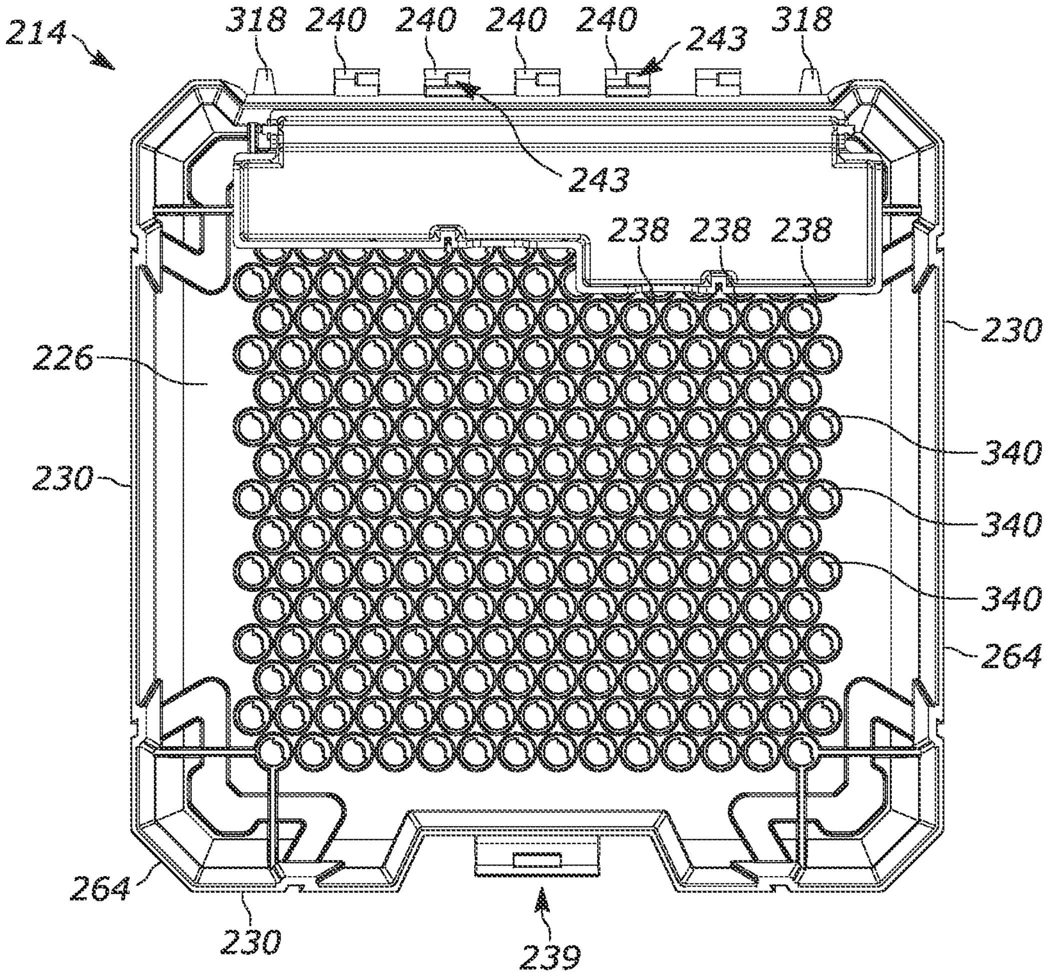
FIG. 12 is a top view of a base of the tool container of FIG. 11.
Figure 13:
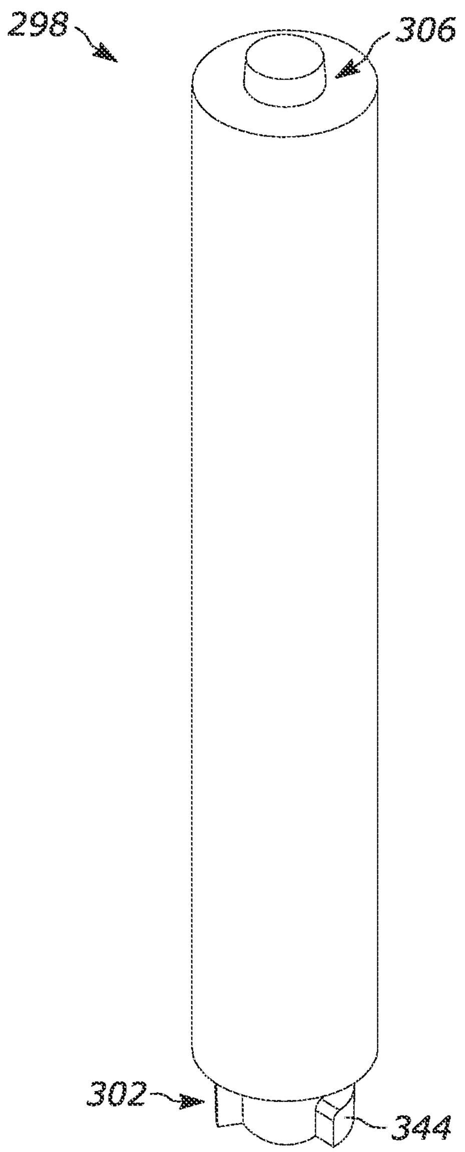
FIG. 13 is a perspective view of a pin of another embodiment.

FIGS. 11-13 illustrate a tool case 210 that is substantially similar to tool case 10. Similar features include the same reference number, plus “200”. Only some differences and similarities between the tool case 210 and the tool case 10 will be described below.

As shown in FIGS. 11 and 12, the tool case 210 has a larger volume than the tool case 10, and includes a base 214 and a lid 218 that each have a larger surface area than the base 14 and the lid 18 of the tool case 10. The larger surface areas allow the base 214 and the lid 218 to include more recesses 238, 250 respectively. The recesses 238 are positioned adjacent to a lower surface 226. In the illustrated embodiment, the recesses 238 are formed directly on the lower surface 226.

The tool case 210 also includes a first locking member or latch (e.g., a toggle latch) 239 with a first movable piece 239*a* and a second movable piece 239*b*. In the illustrated embodiment, the first movable piece 239*a* is a bar that is pivotable relative to the base 214 and engages the second locking member 251 on the lid 218. The second movable piece 239*b* is also pivotable relative to the base 214 between a locked position adjacent a wall 230, and an unlocked position spaced from the wall 230. In the locked position, the first movable piece 239*a* is unable to engage or disengage the second locking member 251.

As shown in FIG. 12, each recess 238 on the lower surface 226 of the base 214 includes a bayonet channel 340. In the illustrated embodiment, the bayonet channel 340 extends around a portion of each recess 238. Each bayonet channel 340 may receive a peg 298 (FIG. 13). In the illustrated embodiment, the peg 298 includes a complementary bayonet projection 344 at the first end 302. The bayonet projection 344 engages the bayonet channel 340 to secure the peg 298 to the base 214 in an orthogonal position relative to the lower surface 226. In other embodiments, the pegs 298 may be threaded, and may be received within a threaded recess 238.

Figure 14:
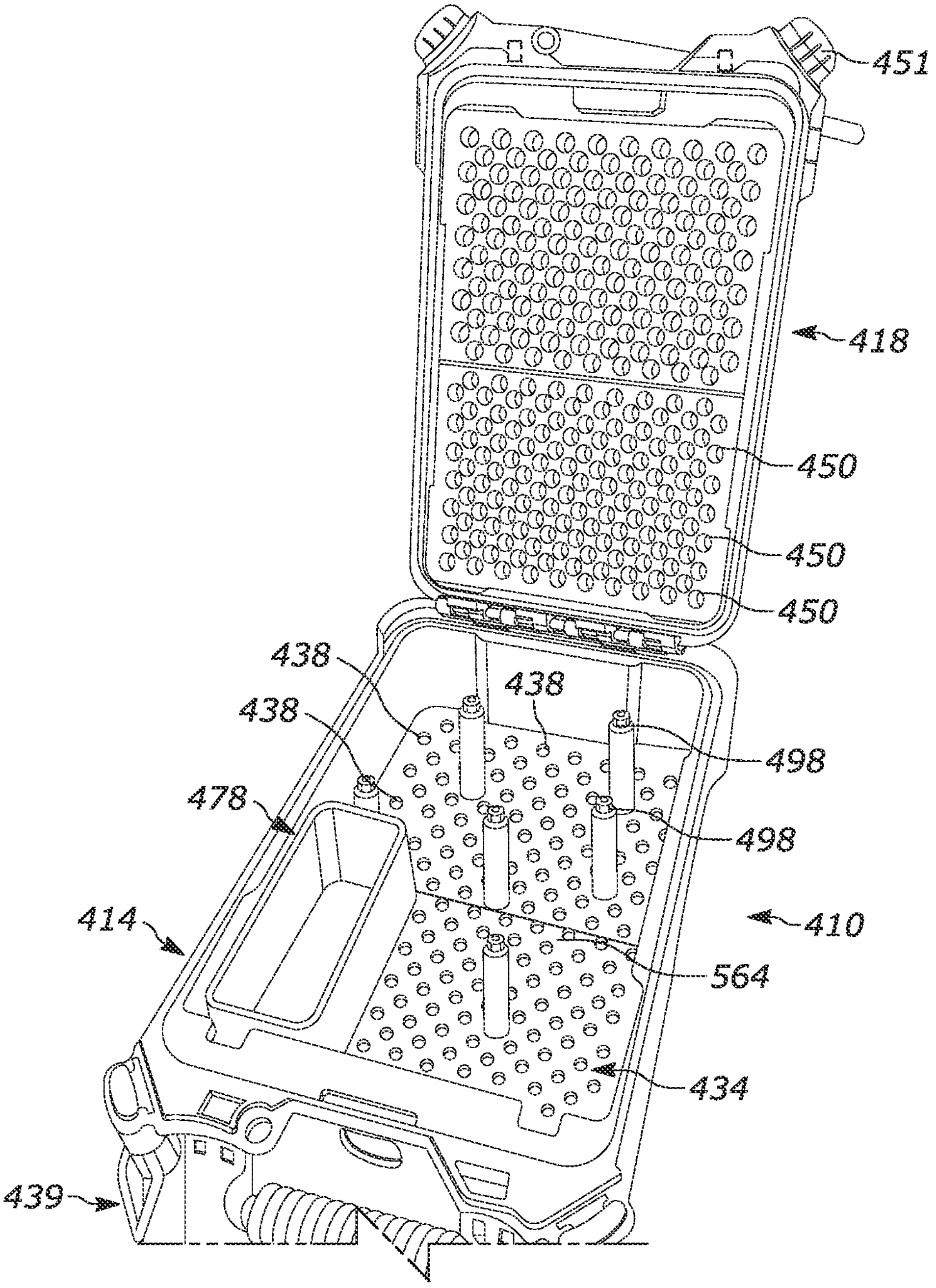
FIG. 14 is a perspective view of a tool container according to yet another embodiment.
Figure 15:
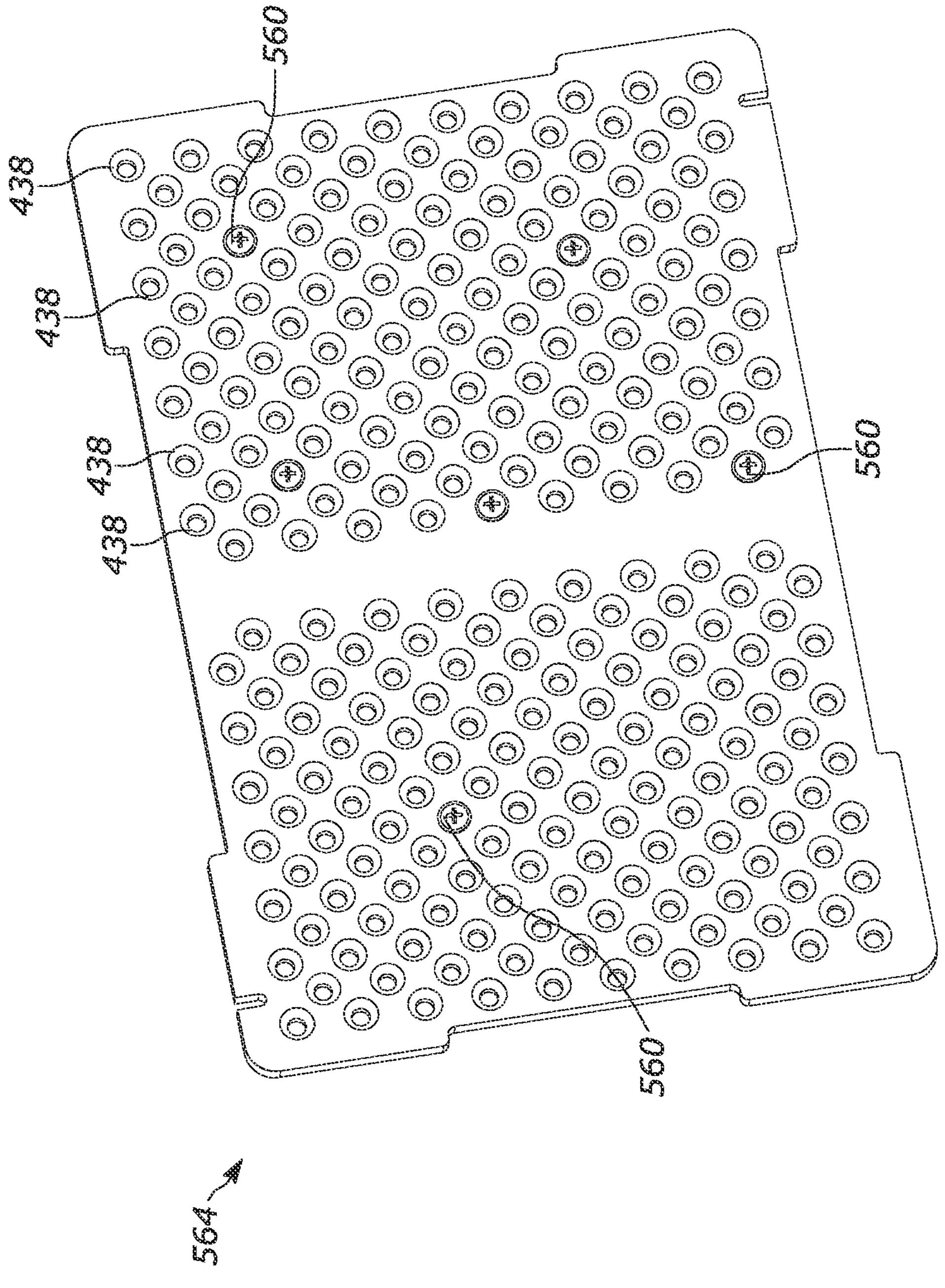
FIG. 15 is a perspective view of an insert of the tool container of FIG. 14.

FIGS. 14 and 15 illustrate a tool case 410 that is substantially similar to tool case 10. Similar features include the same reference number, plus “400”. Only some differences and similarities between the tool case 410 and the tool case 10 will be described below.

As shown in FIGS. 14 and 15, each peg 498 is coupled to the base using a fastening member 560 (e.g., a threaded screw). The tool case 410 includes recesses 438 positioned adjacent to a lower surface of the base 414. In the illustrated embodiment, the base 414 includes a removable panel or insert 564 coupled to the base 414. The insert 564 includes the recesses 438 (i.e., the recesses 438 are not formed directly on the base 414). A user may remove the insert 564 from the base 414 and insert a screw 560 through one of the recesses 238. The user may then couple a peg 498 to the screw 560, which secures the peg 498 in an orthogonal position relative to the insert 564. The peg 498 is thereby secured to the corresponding recess 438 by the screw 560. The user then repositions the insert 564 within the base 514. In other embodiments, at least a portion of the peg 498 may be threaded, and may be received within a threaded recess 438.

FIGS. 16-19 illustrate a tool case 610 that is substantially similar to tool case 10. Similar features include the same reference number, plus “600”. For example, the tool case 610 includes a locking member 651, lugs 692, walls 646, a hinge 622, a latch 639, a recess 664, an upper surface 642, a projection 663, a third receiving portion 654, a fourth receiving portion 658, a second receiving portion 652, a cover 690, a cavity 686, pins 662, a first receiving portion 640, feet 718, and openings 643. Only some differences and similarities between the tool case 610 and the tool case 10 will be described below.

Figure 16:
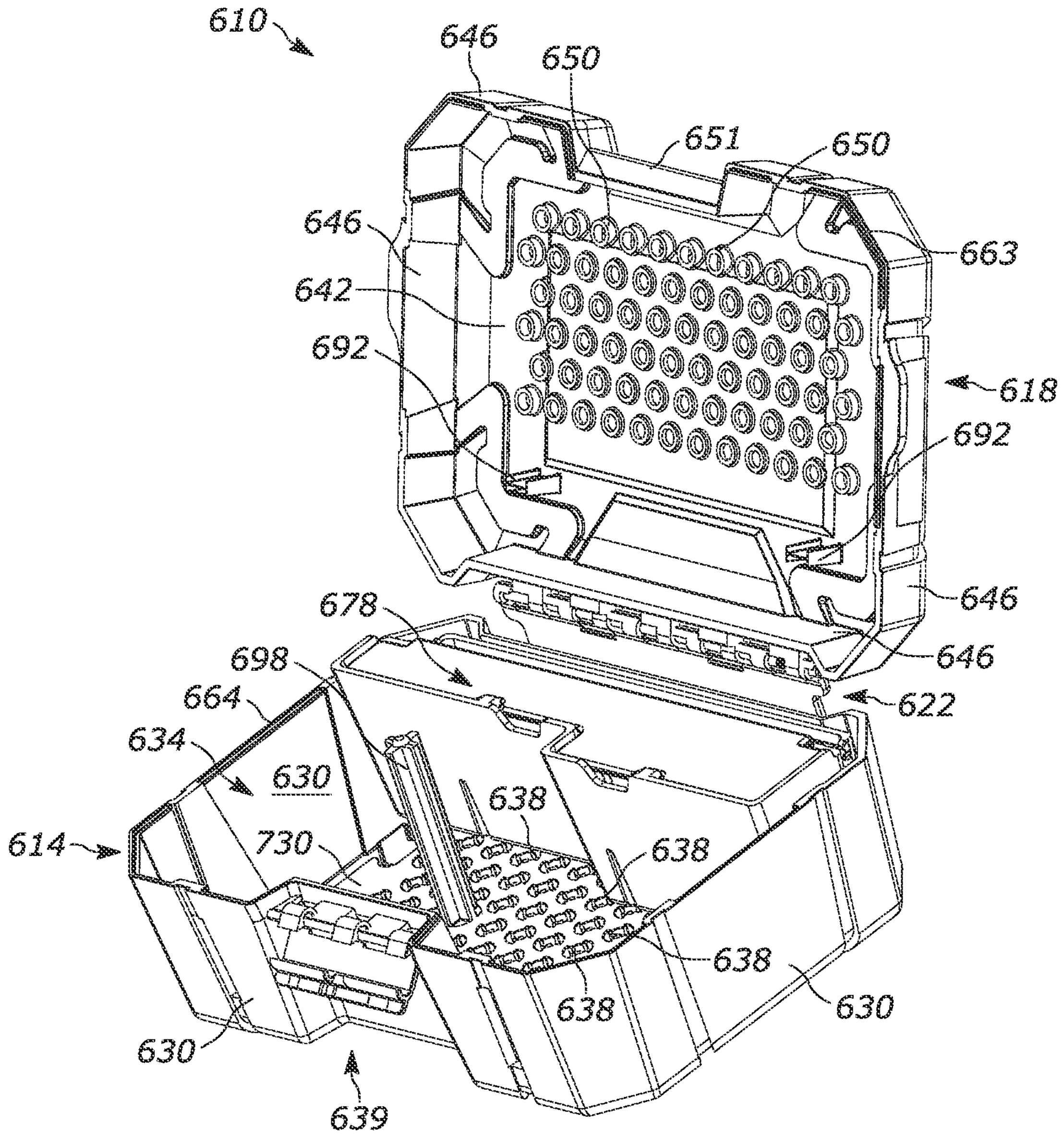
FIG. 16 is a perspective view of a tool container according to another embodiment.
Figure 17:
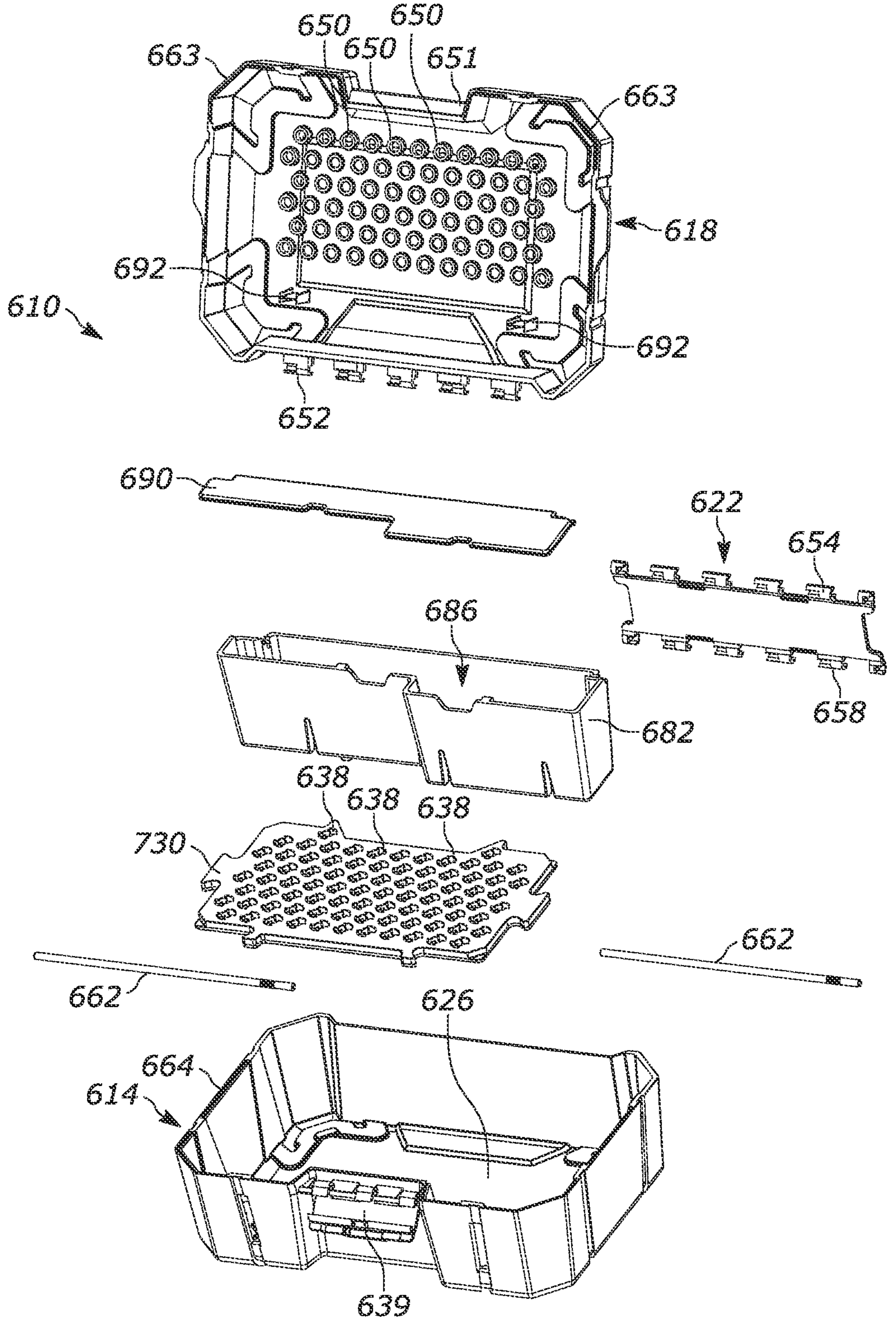
FIG. 17 is an exploded view of the tool container of FIG. 16.
Figure 18:
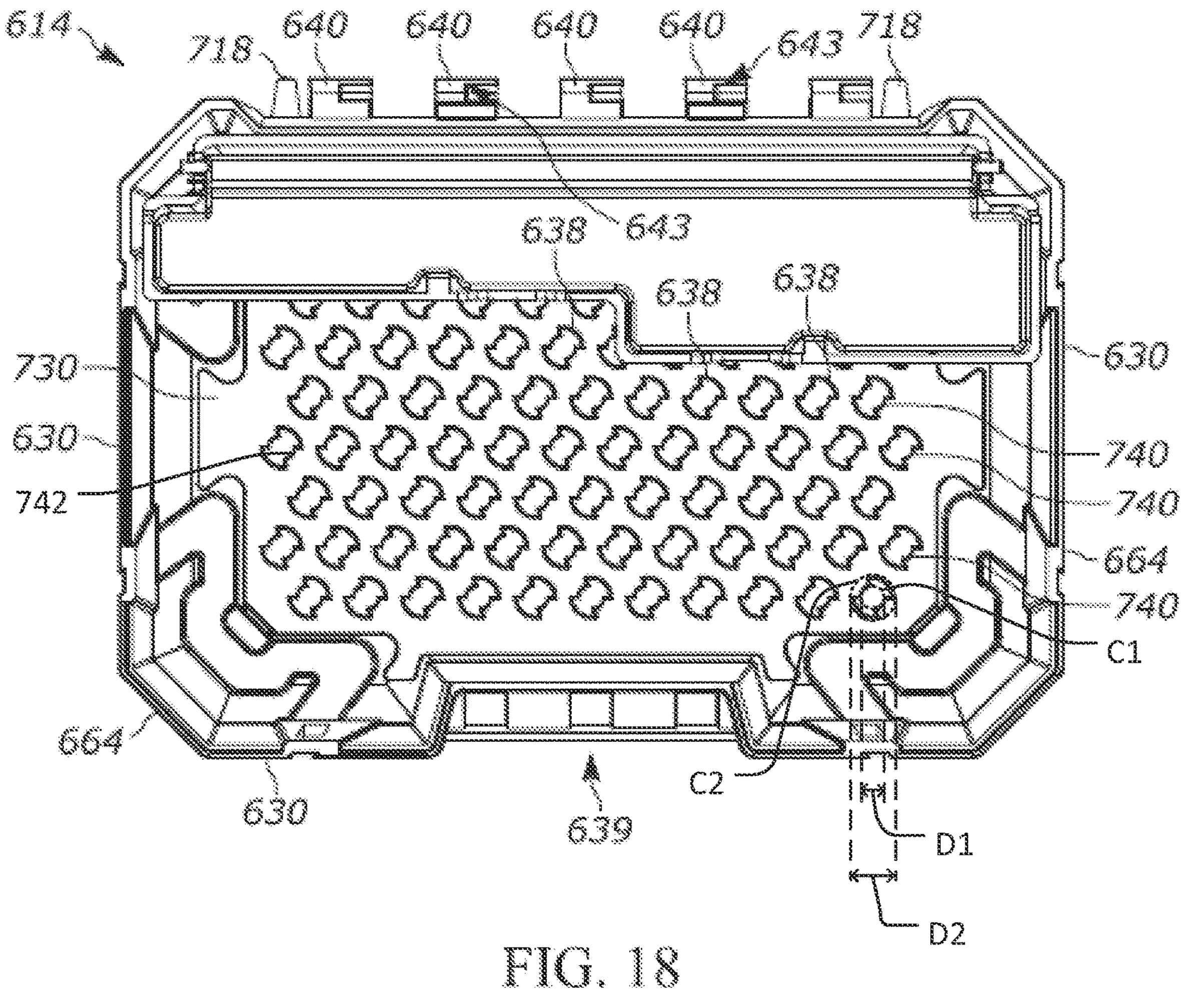
FIG. 18 is a top view of a base of the tool container of FIG. 16.

As shown in FIGS. 16-18, the tool case 610 includes a base 614 with a first or lower surface 626 and walls 630 extending from the lower surface 626 and defining a cavity 634. The tool case 610 includes recesses 638 positioned adjacent to the lower surface 626. In the illustrated embodiment, a removable panel or insert 730 is coupled to the lower surface 626 of the base 614. The removable insert 730 includes recesses 638 (i.e., the recesses 638 are not formed directly on the lower surface 626). The recesses 638 are arranged in rows along the removable insert 730. In the illustrated embodiment, each row of recesses 638 is offset from adjacent rows of recesses 638. Each recess 638 includes a double bayonet shape (i.e., the recess 638 includes a pair of bayonet channels 740). In other words, the recesses 638 define a partially circular shape, with the pair of bayonet channels 740 defining overhangs 742 that extend toward a center of the respective recess 638. The partially circular shape of the recesses 638 includes a first circular portion C1 having a first diameter D1 and a second circular portion C2 having a second diameter D2. The second diameter D2 is greater than the first diameter D1.

Figure 19:
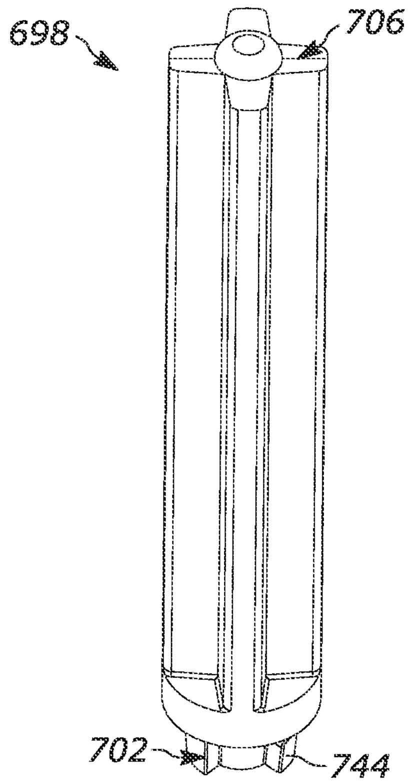
FIG. 19 is a perspective view of a pin used with the tool container of FIG. 16.

As shown in FIG. 19, a peg 698 may be received in any of the recesses 638. The peg 698 includes an elongated body with a first end 702 and a second end 706. The first end 702 includes a bayonet projection 744 that engages a bayonet channel 740 in order to secure the peg 698 to the removable insert 730 in an orthogonal position relative to the removable insert 730. The second end 706 of the peg 698 is received within the recess 650 of the lid 618 that is aligned with the recess 638 of the base 614. In the illustrated embodiment, the second end 706 has a semi-spherical shape and is receivable within a generally circular shaped recess 650. The elongated body of the peg 698 also has an X-shape. Specifically, the peg 698 has an x-shaped cross-section when taken through a horizontal plane (with respect to FIG. 19). The base 682 of the arbor box 678 may include cylindrical pegs (not shown) with a diameter less than the distance between the bayonet channels 740. In other words, the arbor box 678 is not coupled to the removable insert 730 with a bayonet engagement.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A panel for a storage case, the panel comprising:
a body having a planar surface; and
a plurality of recesses arranged in a grid along the body, each recess being similarly shaped and sized and having a double bayonet shape defining a partially circular shape with a pair of bayonet channels, the partially circular shape of each recess including a first circular portion having a first diameter and a second circular portion having a second diameter greater than the first diameter, the first diameter and the second diameter are measured in a common plane defined by the planar surface;
wherein each of the plurality of recesses is configured to selectively receive a peg by a bayonet style coupling, wherein the peg supports a tool accessory,
wherein the grid is arranged in rows along the body, the plurality of recesses within the rows being evenly spaced from each other,
wherein the rows are evenly spaced from each other, and wherein each recess is offset from adjacent recesses in adjacent rows in two directions,
wherein each row extends along an imaginary line,
wherein the second diameter of each recess is measured along an axis of symmetry,
wherein the axis of symmetry is oriented obliquely relative to the imaginary line.

2. The panel of claim 1, wherein the panel is configured to be removably secured in the storage case.

3. The panel of claim 1, wherein the first circular portion is arranged concentrically inside of the second circular portion.

4. The panel of claim 3, wherein the pair of bayonet channels defines overhangs that extend toward a center of the respective recess, and wherein the overhangs define the first diameter.

5. A storage case comprising:
the panel of claim 1; and
a base including a lower surface and walls extending from the lower surface to define a cavity, wherein the panel is coupled to the lower surface of the base within the cavity.

6. The panel of claim 1, wherein the rows include a first row, a second row, and a third row.

7. The panel of claim 6, wherein the plurality of recesses in the first row is aligned with the plurality of recesses in the third row, and wherein the plurality of recesses in the second row is offset from the plurality of recesses in the first and third rows.

8. The panel of claim 7, wherein
the plurality of recesses in the first row is evenly spaced from each other by a first distance,
the plurality of recesses in the second row is evenly spaced from each other by a second distance, and
the first and second distances are equal.

9. The panel of claim 1, wherein
the axis of symmetry is a first axis of symmetry, and
the first diameter of each recess is measured along a second axis of symmetry.

10. The panel of claim 9, wherein the second axis of symmetry is oriented perpendicular relative to the first axis of symmetry.

11. The panel of claim 9, wherein the second axis of symmetry of each recess is oriented obliquely relative to the imaginary line.

12. The storage case of claim 5, further comprising:
a lid pivotably coupled to the base and movable between an opened position and a closed position; and
a peg coupled to one of the plurality of recesses, the peg engaging the lid when the lid is in the closed position.

13. A storage case comprising:
a panel including
a body, and
a plurality of recesses arranged in a grid along the body, each recess being similarly shaped and sized and having a double bayonet shape defining a partially circular shape with a pair of bayonet channels;
a base including a lower surface and walls extending from the lower surface to define a cavity, wherein the panel is coupled to the lower surface of the base within the cavity;
a lid pivotably coupled to the base and movable between an opened position and a closed position; and
a peg coupled to one of the plurality of recesses, the peg engaging the lid when the lid is in the closed position,
wherein each of the plurality of recesses is configured to selectively receive a peg by a bayonet style coupling, wherein the peg supports a tool accessory,
wherein the grid is arranged in rows along the body, the plurality of recesses within the rows being evenly spaced from each other,
wherein the rows are evenly spaced from each other, and wherein each row is offset from adjacent rows, and wherein the lid includes a second plurality of recesses, and wherein an end of the peg is received within one of the second plurality of recesses when the lid is in the closed position.

* * * * *